April 11, 1967  A. B. STOTT ETAL  3,313,392
APPARATUS FOR CONVEYING HOLLOW ARTICLES
TO A PRINTING STATION
Filed Oct. 18, 1965  7 Sheets-Sheet 1
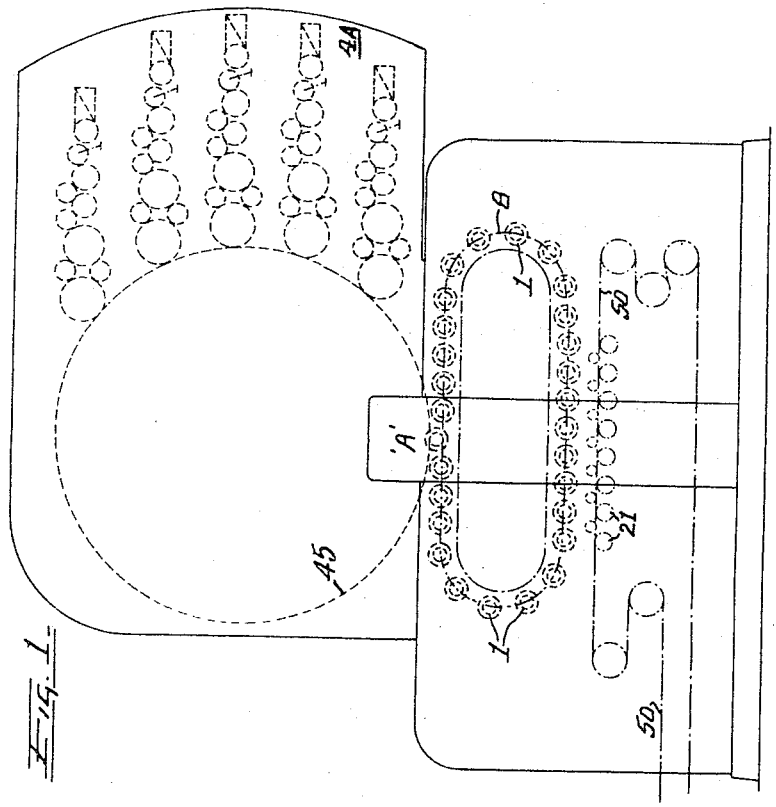
INVENTORS
A.B. STOTT, R. HEMINGWAY & B. PARKER
BY
Abraham A. Saffitz
ATTORNEY

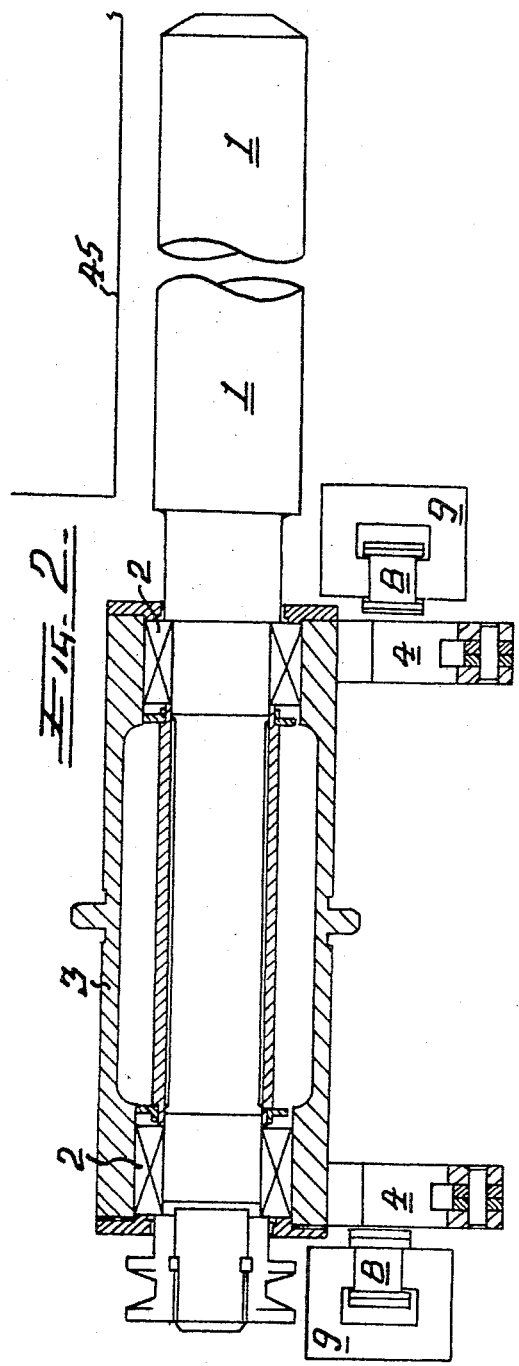

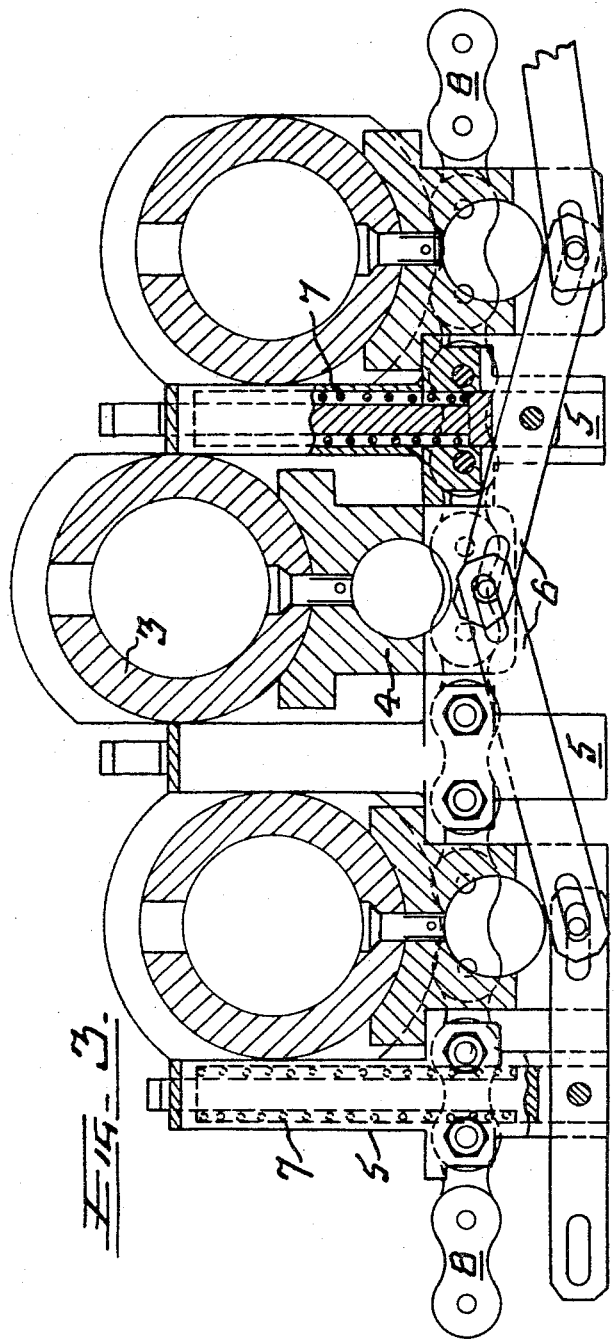

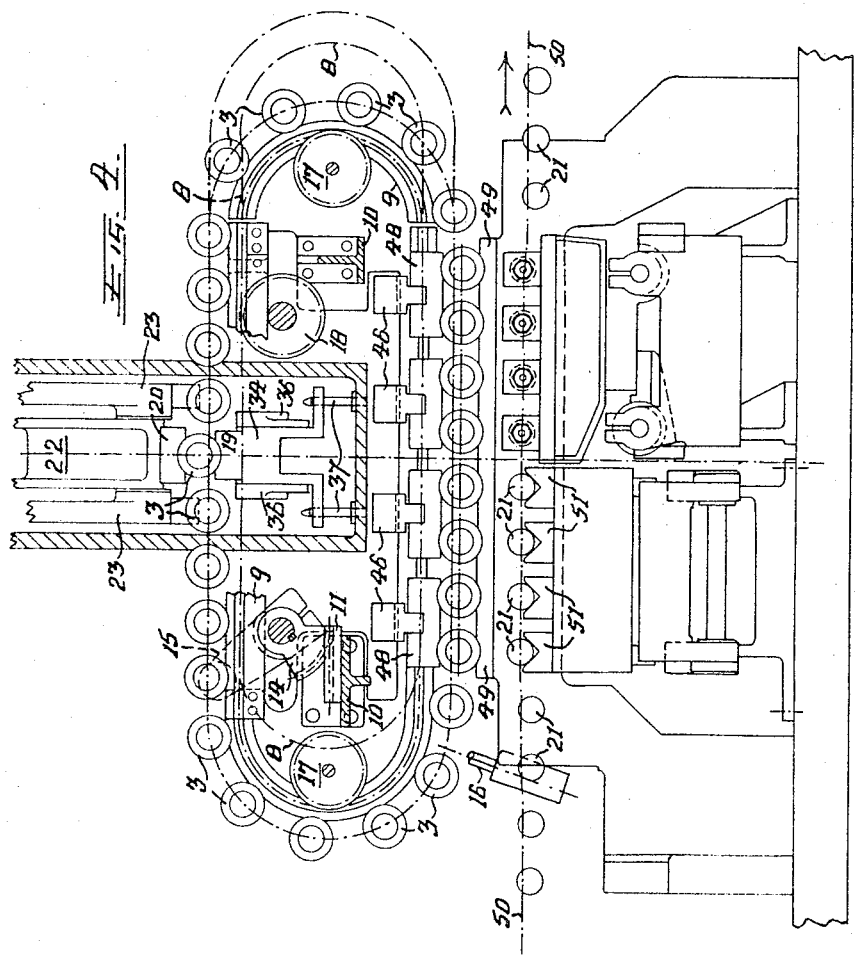

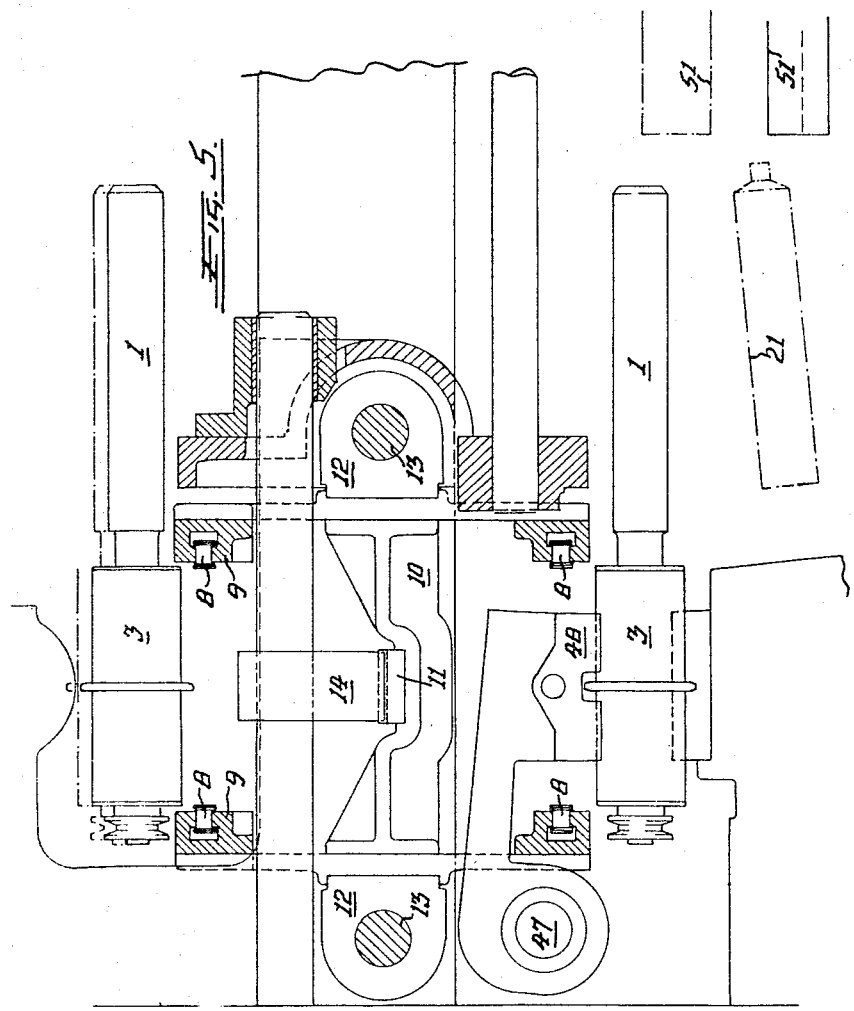

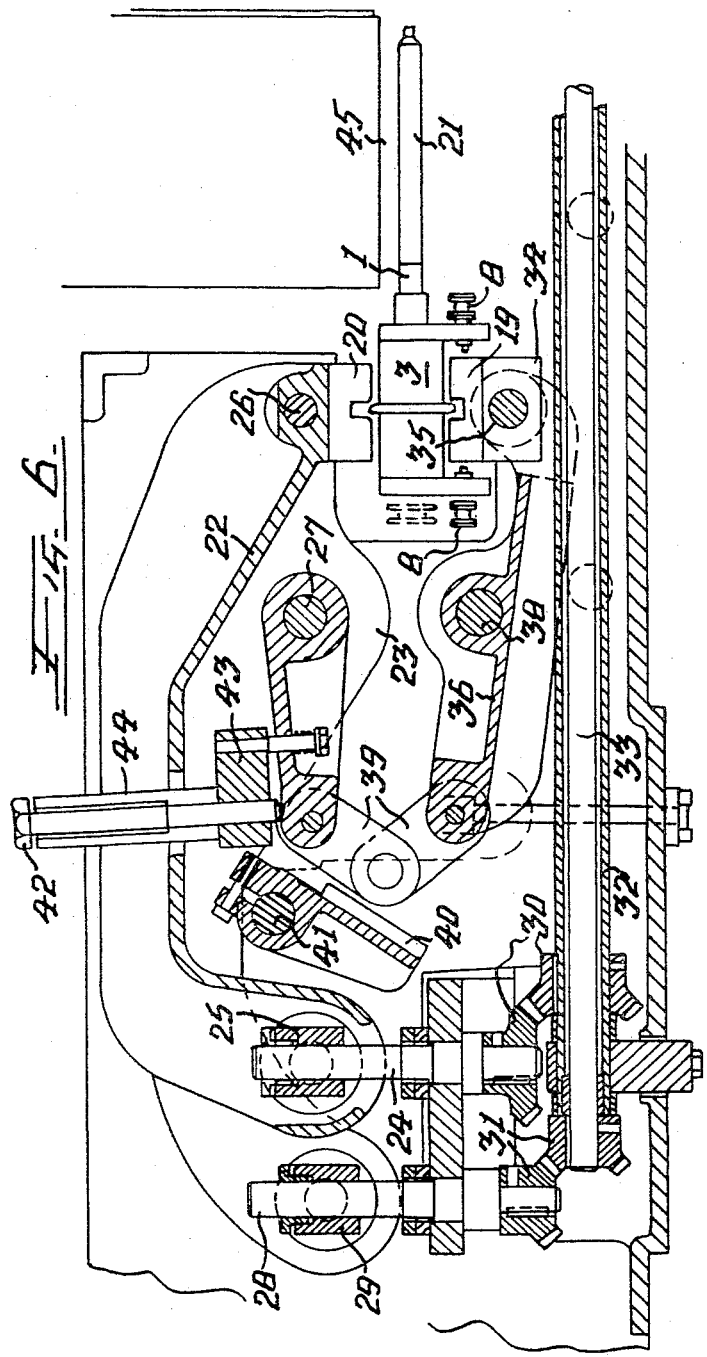

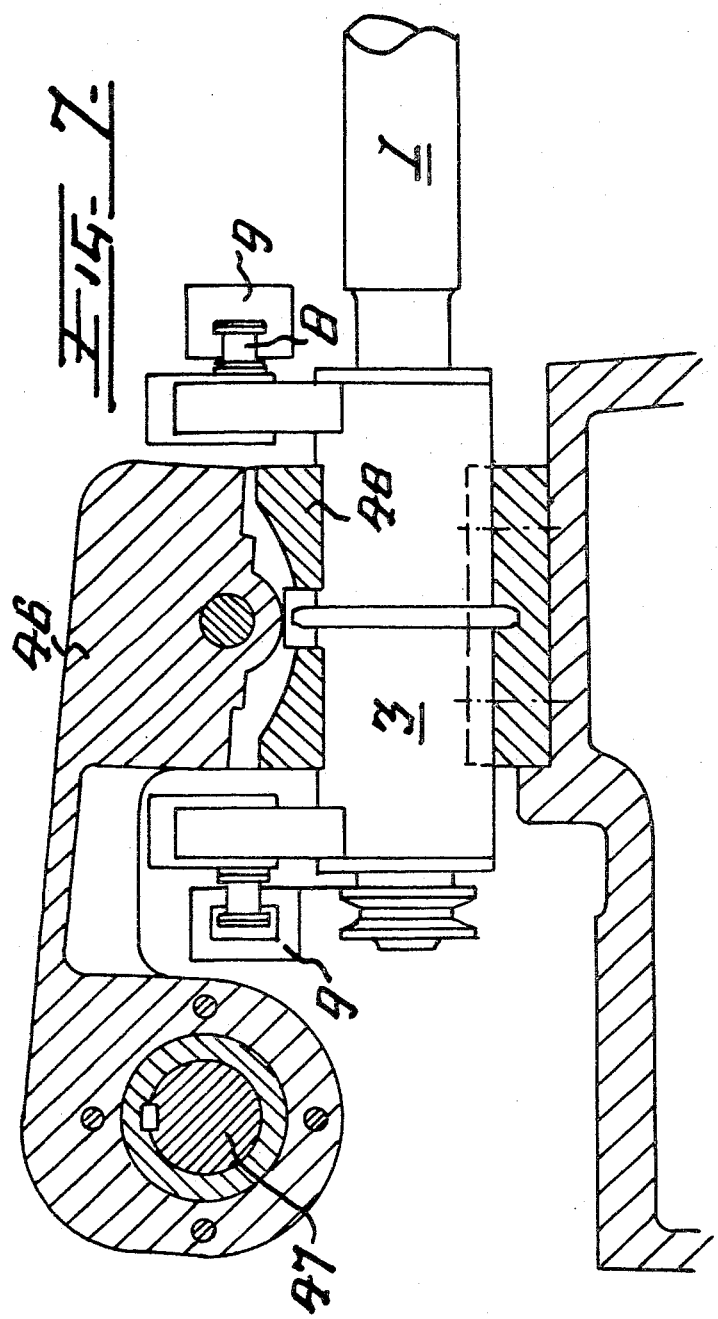

United States Patent Office 3,313,392
Patented Apr. 11, 1967

3,313,392
APPARATUS FOR CONVEYING HOLLOW ARTICLES TO A PRINTING STATION
Alfred Bentley Stott, Ronald Hemingway, and Brian Parker, Otley, Yorkshire, England, assignors to Dawson, Payne & Elliott Limited, Otley, Yorkshire, England
Filed Oct. 18, 1965, Ser. No. 497,359
2 Claims. (Cl. 198—19)

The invention has as its object a new or improved method of and means for printing, enamelling, varnishing or coating the exterior surfaces of hollow articles such as collapsible tubes of metal or plastics substance, or rigid-containers of such materials of circular cross-sectional shape of either cylindrical or frusto-conical form.

In conventional machines for carrying out the aforesaid processes, containers are fed singly on to rotatable mandrels or spindles mounted on a dial which latter is indexed to bring each mandrel in turn adjacent to a printing cylinder or coating roller. After treatment the finished containers are removed singly from the mandrels and placed on a conveying system for transportation to a drying oven.

The maximum speed of such machines is governed by the limitations imposed in feeding to and removing single containers from mandrels and placing them on a conveyor, rather than by the maximum speed of indexing of the dial, the aforesaid operation having to occur during the stationary part of the indexing cycle which part, at high speeds, is quite brief.

The present invention overcomes the aforesaid feeding and removing difficulties at high speed by substituting for the said dial a circuit or track of mandrels which track could be but is not necessarily of circular shape.

According to the invention the means for conveying hollow articles relatively to a printing or coating station, a delivery station and a feeding station include an endless track or circuit arranged to be actuated and indexed in such a manner that one part of the track is adapted to be indexed to move one article at a time to the printing or like station whilst another part of the track is adapted to be indexed to simultaneously move a plurality of processed articles to the delivery station for removal and also provide for the feeding to the track of a plurality of unprocessed articles.

In order that the invention may be fully and clearly comprehended the same will now be described with reference to the accompanying drawings, in which:

FIGURE 1 is a diagrammatic front elevation of a five colour printing machine provided with means for feeding and delivering containers for printing according to the invention.

FIGURE 2 is a partly axial section of a mandrel barrel and the upper span of the conveyor means shown in FIGURE 1.

FIGURE 3 is a sectional side view of three mandrel barrels of the kind shown in FIGURE 2 and the corresponding portion of the upper track illustrated in the previous views.

FIGURE 4 is a front view of the mandrels, tracks and allied parts showing associated jaws at the printing station and the feed and the delivery stations.

FIGURE 5 is a sectional end view of part of the assembly shown in FIGURE 4.

FIGURE 6 is a section through the centre line of the machine illustrated in FIGURE 1, showing jaw clamping mechanism according to the invention at the printing station.

FIGURE 7 is a section through a clamp at the feed and delivery stations.

In the general or diagrammatic arrangement of the invention illustrated in FIGURE 1 it will be observed that twenty eight mandrels 1 are connected together by endless chains 8 to form an endless track of quasi-elliptical configuration. It must, however, be understood that any other convenient number of mandrels could be employed.

The mandrels of the upper span of the track are intended to carry containers or articles to be processed, the track being adapted to be indexed so that each mandrel, with its container, in turn reaches a station A below the printing cylinder 45 of a printing machine 4A or the roller of a coating machine whereupon the mandrel is raised to contact the said cylinder for the container to be either printed or coated. The mandrel is then lowered to its previous position and indexed away from the station A. The motion of the mandrels on the upper span of the track is a continuous indexing motion, one container being treated per cycle from left to right.

The mandrels on the lower span of the track carry containers to and away from the feed and delivery positions the said mandrels being indexed once every four cycles in a movement from right to left. Four mandrels are indexed at one time to enable four containers to be fed on and another four to be simultaneously removed from the track.

Hence, should the machine be printing or coating containers at a rate of 80 per minute, the mandrels on the upper span of the track are being indexed at 80 per minute whilst the mandrels on the lower span are being indexed at 20 per minute—four mandrels per index—and containers are being fed four at a time, 20 times per minute, and removed four at a time, 20 times per minute. Consequently, the speed of feeding and removing is one quarter that of the printing or coating speed.

Referring more particularly to FIGURES 2 and 3, the mandrels 1 intended to hold and carry the containers are freely rotatable in bearings 2 mounted in barrels 3 attached to a carier member 4 at each end. The barrels 3 and carriers 4 are constrained laterally but are capable of movement in a vertical plane with the carriers held in engagement with spring boxes 5 by links 6 and springs 7. The boxes 5 are in turn located on and attached to a pair of endless chains 8, supported in quasi-elliptical configuration, which chains run in tracks 9. Each barrel 3 has formed with it a central flange whose purpose is to locate the barrel laterally in the jaws when clamped, as described hereafter. Consequently, any individual mandrel and barrel can be lifted off its box 5 into the printing position shown at station A in FIGURES 1, 2 and 3.

The two chain tracks 9, (see particularly FIGURE 4) each carries a chain 8, the two chains jointly supporting the ends of the barrels 3, the said tracks being maintained in line with and attached firmly to each other through the agency of cross members 10 one of which latter carries a short rack 11.

Also forming part of the track assembly are four lugs 12 (FIGURE 5) fitting freely on short shafts 13 to allow the track assembly 9 to move laterally along the shafts 13. Movement of said assembly is controlled (see FIGURES 4 and 5) by a segment 14, rack 11, a lever 15 and a connecting rod 16 actuated by a cam (not shown).

The chains 8 are aligned by co-acting wheels 17 at each end of the track assembly and together with the mandrels 1 are indexed or traversed one mandrel pitch at a time by chain wheels 18 driven by any suitable mechanism such, for instance as a Geneva gear. Positioning and timing of the said wheels 18 are such that one mandrel assembly is situate below the printing cylinder centre line, i.e. at station A (FIGURE 1), at each indexing cycle.

As a barrel 3 and mandrel 1 carrying a container 21 is positioned at the station A (see FIGURES 4, 5 and 6), the assembly is moved away from its seating on the spring boxes 5, lifted vertically by the lower jaw 19 and clamped between the latter and the upper jaw 20. Whilst thus clamped, the container 21 and its mandrel are revolved by the printing cylinder 45 and the exterior of the container is printed. Although the jaw 20 remains stationary it is vertically adjustable to provide for containers of various diameters and is furthermore angularly adjustable to permit of raising and lowering of the outer end of the mandrel to maintain an even pressure between a container 21 and the cylinder 45, in well known manner.

The jaw 20 (see FIGURE 6) is mounted on a carrier member 22 whose end is pivotally mounted between arms 23. By operating a screw 24 in a nut 25 attached to the carrier 22 the jaw 20 can be caused to pivot slightly about a co-acting pin 26 for raising and lowering the outer end of the mandrel 1.

By pivotally mounting the arms 23 on a pin 27, providing a screw 28 in a nut 29 attached to the said arms, the jaw 20 may be raised or lowered by operating the said screw.

Both screws 24 and 28 are operated by bevel gears 30 and 31 respectively, shafts 32 and 33 being arranged to be rotated by conveniently located handwheels (not shown).

The lower jaw 19 is mounted on a block 34 pivoted on a pin 35 in a lever 36 which block is restrained from rotational movement by pins 37. The lever 36 is free to oscillate on a pin 38 and is caused to do so by toggles 39 being closed or opened by a lever 40 on a shaft 41 operated by a cam (not shown), the cam being suitably timed to close the jaws and raise the mandrel 1 for printing of an article whilst mandrels on the upper span of the track are stationary during the indexing cycle. Pressure between the jaws 19 and 20 is regulated by operating a screw 42 in a block 43, 44 being a locking nut.

In order to feed containers 21 on to mandrels 1 and thereafter remove the containers it is essential that the mandrels be accurately positioned at the time of such feeding and removing. To this end (see FIGURES 4, 5 and 7) the containers 21 are transferred whilst the mandrels are stationary along the lower span of the track. In the example illustrated in the drawings eight mandrels 1 with their barrels 3 are depressed from their seatings on the chains 8 by movement of four arms 46 actuated by a shaft 47. The arms carry jaws 48 mounted in pairs for convenience. The jaws 48 depress the barrels 3 into a stationary eight-piece jaw 49 and the barrels are clamped between two sets of jaws 48 and 49 to securely and accurately position them whilst the transfer of the containers 21 is taking place. The arms are arranged to be actuated by a cam (not shown).

Adverting once more to FIGURES 4 and 5, the sequence of events of the machine motions repeat every four cycles, that is when four containers 21 have been printed. The upper horizontal section of mandrels are indexed along twice, i.e. for two cycles, whilst the lower horizontal section of eight mandrels 1 is clamped and remains static. The chain track assembly 9 is thus caused to move to the right (see broken lines in FIGURE 4), sliding freely upon the short shafts 13. The lower eight mandrels 1 are then unclamped and tracks 9 are moved to the left by rack and segment 11 and 14 as shown in full lines in FIGURE 4. This causes the eight bottom mandrels to move four places to the left, during which time a further two containers have been processed on the upper section. The chain tracks are now in the same position as they were at the commencement and the mechanism is ready to repeat.

Containers 21 are introduced into the machine on chain 50, which is equipped with suitable pins on which the containers lie. Thus chain 50 is driven continuously but the portion of chain at the transfer point is caused to be stationary for the transfer of containers from it by a chain-stopping mechanism (not shown). By suitably spacing the pins on the chain 50 and correspondingly timing the pins four containers are arranged to be stationary immediately below four stationary mandrels (the four to the left of the machine centre-line). Containers are displaced from the pins either mechanically or pneumatically into four waiting V's 51 which latter are then raised vertically until the centres of the containers and the centres of the four mandrels coincide. Containers are then fed on to the mandrels and traverse the circuit until, fully processed, they arrive finally at four positions (to the right of the machine centre-line) where they are removed from the mandrels either mechanically or pneumatically, lowered, and fed on to four waiting pins of the conveyor chain.

Since movement of mandrels at the transfer point is right to left, and movement of the conveyor chain and pins is from left to right, it will be seen that four mandrels, having had processed containers removed, move immediately to the left to have four unprocessed containers fed on. Similarly, four conveyor chain pins having had four unprocessed containers removed, move immediately to the right to have four processed containers fed on.

The mechanisms for feeding and removing containers are reasonably conventional and are therefore only sketchily shown in the attached drawings.

It must be understood that instead of a printing machine being employed in conjunction with the herein described system of feeding and delivering articles to be processed, a coating machine may be utilised. Consequently wherever the term "printing" has been used in the description the term "coating" may be substituted therefor.

We claim:

1. A conveyor system for conveying hollow articles to a printing station comprising: a delivery station; a feeding station which includes an endless track, a pair of endless chains supported by wheels riding on said endless track, a plurality of mandrels rotatably mounted on said chains to support said hollow articles which are conveyed; first means for raising and lowering the mandrels to bring a hollow article into printing position at the printing station, said first means including monitoring and indexing means for monitoring one article at a time on one part of said track and for indexing said one article when presenting said one article to said printing station, said second means serving to index a plurality of articles at another part of said track and controlling the indexing of said plurality of articles as a group at said other part of said track when discharging the group after printing adjacent said feeding station, said other part of said track further including means for feeding a plurality of unprinted hollow articles to said first means after the removal of the group of printed articles, said other part of said track further including adjustable moving means for raising and lowering said mandrels, said mandrel-moving means including manually operated locking means for holding the lowered mandrels in a stationary condition to prevent horizontal displacement of said mandrels.

2. A system as claimed in claim 1, wherein said adjustable moving means for said mandrels comprises a lower jaw, an upper jaw, and a toggle connecting these jaws, the opening between the lower and upper jaws being adjustable to the dimension of the hollow article, whereby at least two articles are indexed at a time.

References Cited by the Examiner

UNITED STATES PATENTS

| | | | |
|---|---|---|---|
| 2,551,080 | 5/1951 | Allen et al. | 198—19 |
| 2,796,164 | 6/1957 | Hakogi | 101—40 X |
| 3,253,538 | 5/1966 | Rudolph et al. | 101—40 |

EVON C. BLUNK, *Primary Examiner.*

R. J. HICKEY, *Assistant Examiner.*